United States Patent [19]

Lundquist et al.

[11] Patent Number: 5,561,191
[45] Date of Patent: Oct. 1, 1996

[54] METHOD FOR THE PRODUCTION OF SILANE CONTAINING CROSSLINKED PVC COPOLYMER

[75] Inventors: Morten Lundquist, Halden; Jan O. Laundal, Skien, both of Norway

[73] Assignee: Norsk Hydro A.S, Oslo, Norway

[21] Appl. No.: 392,991

[22] Filed: Mar. 6, 1995

[30] Foreign Application Priority Data

Sep. 14, 1992 [NO] Norway ................................. 923561

[51] Int. Cl.$^6$ .......................... C08K 5/54; C08L 83/06
[52] U.S. Cl. .................... 524/568; 524/860; 524/863; 524/731; 524/265; 524/263; 524/268; 524/267; 525/342; 252/400.31
[58] Field of Search .................................. 524/265, 263, 524/268, 731, 863, 860, 568, 267; 525/342; 252/400.31

[56] References Cited

U.S. PATENT DOCUMENTS 5,191,019  3/1993  Dahl et al. .......................... 525/103
5,194,470  3/1993  Carette et al. ...................... 524/265

FOREIGN PATENT DOCUMENTS 0017956  2/1976  Japan ................................ 524/265

OTHER PUBLICATIONS

Abstract of JP 56074105-A.
Abstract of NO 8900543-A.
Abstract of WO 9305112-A1.

*Primary Examiner*—Paul R. Michl
*Assistant Examiner*—Olga Asinovsky
*Attorney, Agent, or Firm*—Wenderoth, Lind & Ponack

[57] ABSTRACT

Method for the production of a thermostable crosslinked PVC copolymer where the crosslinking is carried out in the presence of humidity and after processing of the polymer. The copolymer is a copolymer of vinyl chloride and 0.05–10 weight % of a vinyl containing alkoxysilane compound. Preferably methacryloxy-propyltrimethoxy-silane or methacryloxy-propyltriethoxysilane is used as comonomer. The crosslinking can be carried out independent of the type of stabilizer. A condensation catalyst and also an inhibitor can be used to prevent too early crosslinking.

14 Claims, No Drawings

METHOD FOR THE PRODUCTION OF SILANE CONTAINING CROSSLINKED PVC COPOLYMER

BACKGROUND OF THE INVENTION

1. Field of the Invention

This invention concerns production of a thermostable crosslinked PVC copolymer. The copolymer comprises a comonomer with a hydrolyzable substituent. This substituent is a member of the group of hydrolyzable alkoxysilanes, and will from now on be called the silane group.

2. Description of the Related Art

In literature there is described several methods for production of crosslinked PVC, but only few of these are in use in an industrial scale today. Radiation is one of the techniques most used for crosslinking of PVC. Other methods are based on for example multifunctional plasticizers which are activated by radical initiators. Further, blocked polyisocyanates can be used as crosslinking agents and different polyfunctional thiols would also give crosslinked PVC.

Some of the disadvantages with these systems are that often very poor thermostability is obtained for the products, discolouring as a result of degradation, increased brittleness and too quick crosslinking which also have influence on the ability to form the products and their appearance.

Lately the patent literature has described processes where bifunctional silanes are used as crosslinking agents (DE 3 719 151, JP 55 151 049, NO 166 189). These processes are different from the above described in that processing and crosslinking is separated. Bifunctional silane crosslinking agent is added to the compound. During processing and at high temperature (140–190° C.) the crosslinking agent reacts with the polymer while the silane-groups remain intact. After shaping of the product the water/steam treatment will result in that the silane groups are hydrolyzed and crosslinked. This technique has clear advantages in preference to those where crosslinking is taking place during processing as the processes can be better controlled and the time for crosslinking can be determined.

These methods however also have their limitations. When using γ-mercaptopropylsilane as crosslinking agent as described in DE 3719151 a lead stabilizer is needed to obtain crosslinking. This a clear disadvantage for the environment. In this patent there is used time periods of 6 hours to obtain sufficient crosslinking. This is an unrealistic long time and will be commercially unfavourable. Further it is a fact that yellow complexes are formed which characterize the products. This own colour of the products make it difficult to make manufactured products with pigmentation as wanted.

In Norwegian patent application No. 912341 however there is described how to prevent yellow colour by addition of low molecular epoxy resin. It is also possible to use aminosilanes instead of mercaptosilane to avoid the problems with colouring of the plastic. Further, by use of aminosilanes as a crosslinking agent one proceeds with separation of processing and crosslinking. A weak point however is that amines generally have negative influence to the heat stability of PVC.

SUMMARY OF THE INVENTION

The object of the invention is to produce a crosslinked product with good heat stability and without own colour. Another object is to produce the products independent of the addition of certain types of stabilizers. It is also important to produce the products under moderate conditions and with short crosslinking time to obtain good rest stability. It is also an object to reduce the use of chemicals and to avoid toxic chemicals.

These and other objects of the invention are obtained with the process as described below, and the invention is characterized and defined with the accompanying patent claims. The present invention concerns production of a crosslinked halogen containing polymer by copolymerisation of VCM and a vinyl containing alkoxysilane compound. It is preferable to use 0.05–10 weight % of a vinyl containing alkoxysilane compound of the general formula:

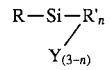

where
R= methacryloxypropyl- or acryloxypropyl-function,
R'= a freely chosen non-hydrolyzable group
Y= a hydrolyzable group, and with n=0,1 or 2, for example —OCH$_3$, —OC$_2$H$_5$, —OC$_3$H$_7$, —OC$_2$H$_4$OCH$_3$, —OC$_4$H$_9$

DESCRIPTION OF THE PREFERRED EMBODIMENTS

It is preferable to use 0.1–4 weight % silane. It is preferred to use methacryloxy-propyltrimethoxy-silane or methacrylory-triethoxy-silane. The polymerisation can be carried out by suspension-, microsuspension- or emulsion-polymerisation. It is preferred to add the silane in doses or continuously during the polymerisation. The crosslinking can be carried out in the presence of 0–10 weight % stabilizer, for example Ca/Zn-, Ba/Zn-, tin- or lead stabilizer. A condensation catalyst could also be added for crosslinking of silanol groups and eventually an inhibitor to prevent too early crosslinking.

The invention also include a thermostable crosslinked copolymer with a content of 30–98 weight % copolymer of vinyl-choride and a vinyl containing alkoxsysilane compound, 0–70 weight % plasticizer, 0–10 weight % stabilizer, 0–3 weight % lubricant, 0–5 weight % inhibitor and 0–15 weight % filler.

This copolymer could also be mixed with PVC homopolymer or other polymers such as nitrile rubber, chloroprene rubber, ABS (acrylontrile-butadiene-styrene), PVAC (polyvinyl-acrylate) and PC (polycarbonate) to vary the degree of crosslinking. Such addition could also give new properties to the product such as lower permeability to chemicals or gases, and also increased strength and flexibility.

To obtain a stable suspension/emulsion it is preferable to add the silane comonomer after about 30 minutes polymerisation. By copolymerisation with VCM it is for kinetic reasons favourable to use mostly continuous addition of silane comonomer into the reactor. The silane comonomer will be rapidly consumed and will not be concentrated in the momomer phase. Acrylate and methacrylate could both be used as long as the copolymerisation factors r1 and r2 are such that the acrylate is not concentrated in the monomer phase. The stability of the silane groups are dependant on the pH and it is therefore favourable that the polymerisation system is buffered so that the pH will not sink below 6.5. Sodium-bicarbonate$_{(aq)}$ is used as buffer. This also is generally carried out to prevent corrosion problems in process equipment.

Below there is shown how the silane containing copolymer is crosslinked in two steps by an initial hydrolysis of the alkoxysilane so that an active silanol is formed. This reaction is followed by condensation of two silanol groups from different polymer molecules and with liberation of water:

formula $HS-R-Si(OR')_3$, where R= propyl, R'= methoxy, ethoxy or methoxyethoxy, are efficient.

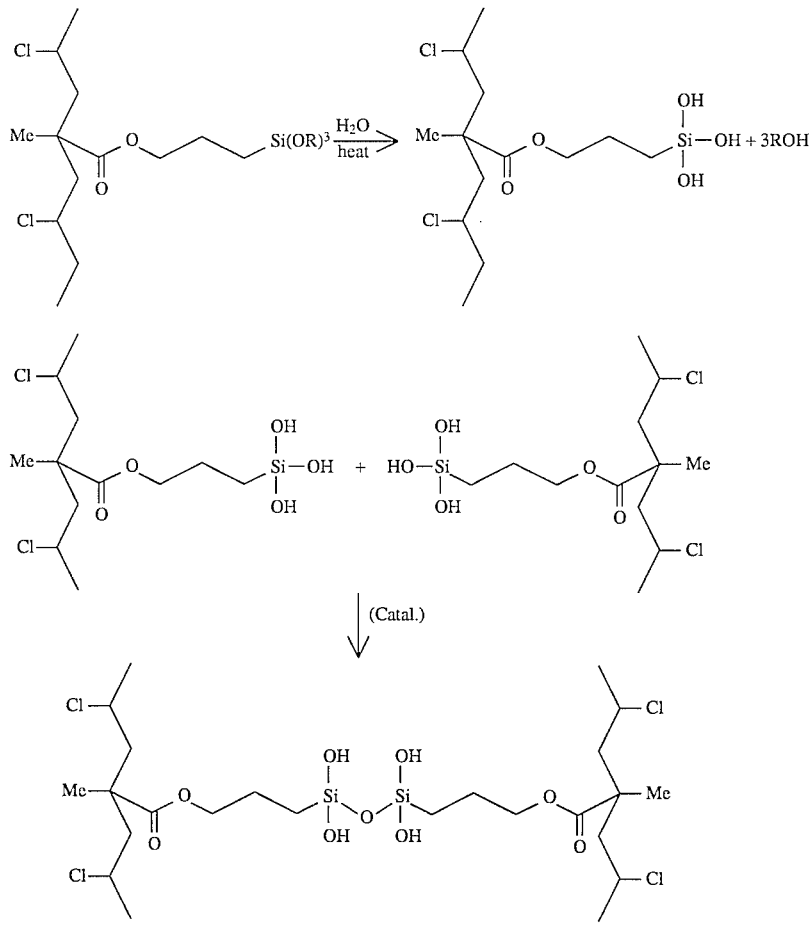

The rest of the silanol groups would be able to react further and reinforce the network.

It is favourable to use controlled amounts of a condensation catalyst for crosslinking of silanol groups. These are added in an amount of 0–2 weight %. Examples of known silanol condensation catalysts are tin-, iron-, lead-, and cobalt carboxylates. Different organo-tin compounds are also known such as dibutyltindilaurate, dioctyltindilaurate, dibutyltin dimercaptan, tinacetate, leadnaphthenate, different alkylamines, different mineral acids/-bases, organic acids such as p-toluene-sulphonic acid, acetic acid and also different saturated fatty acids. The organic tin stabilizers are very efficient and are those most used for crosslinking of alkoxysilanes. An unwanted extra effect by the known lead- and tin- condensation catalysts is that they will give crosslinking during processing.

To prevent too early crosslinking and to enlarge and improve the network in the polymer, different compounds can be added. Examples of these are silanes chosen from bis(3-triethoxy propyl)disulphide, dimeric silanes with formula $(RO)_3Si-R'-Si(OR)_3$ where R' is $C_4-C_{18}$, alkylsilanes $R''-Si(OR)_3$ where R''= alkylgroup with from $C_4-C_{18}$ chain length and R= ethyl, methyl or propyl, which all have an inhibiting effect on crosslinking. Also mercaptosilanes of the The actual inhibitors are added in an amount of 0–5% (based on the amount of PVC-copolymer). The addition of inhibitor is especially useful in the cases where lead is used as stabilizer.

The invention will be illustrated by the following examples. For all samples the following analyses have been carried out:

Gel content

Gel content is given as part of crosslinked PVC being insoluble in THF (tetrahydrofurane). It is measured for foil exposed to steam by extraction in THF for 24 hours at room-temperature.

Stress Relaxation

The extent of crosslinking in the foils is also evaluated by stress relaxation experiments in a dynamic spectrometer (Rheometrics RDS 7700). The stress relaxation was measured for rolled foil (thickness 0.5 mm) at 170° C. after 5 minutes, and also after steam treatment in autoclave at 120° C.

The given values are the ratio between the stress relaxation module initially and after 100 seconds measured at 30% constant deformation for S-PVC (8% for E-PVC). The result is given in percentage, and the higher the value is the more crosslinking sites are present in the material. The basic value for the foils is in the area 10–15% because of so-called physical network tie points (crystallites).

Thermal Stability

Thermal stability/rest stability is measured as Congo-Red stability (ISO R182) at 200° C. For this test 5 g foil is finely chopped and put into a test tube which was placed in an oil bath at 200° C. The stability is given as the time (in minutes) until an indicator strip in the test tube shows that HCl is being liberated.

EXAMPLE 1

Four different compounds were produced with composition as shown in table 1. For the compounds E3 and E4 there was used an emulsion copolymer of VCM and 0.5 mol % (2 weight %) methacryloxy-propyltriethoxy-silane (Si223 from Degussa), while E1 and E2 are vinyl chloride homopolymers being polymerized according to an identical recipe.

All the ingredients were mixed and the pastes were coated on to a release-paper. The pastes were gelatinized for 5 minutes at 200° C. in a Werner Mattis oven. Measurements for the content of gel insoluble in THF in % and % relaxation at 150° C. are carried out before and after steam treatment for 30 minutes. The results are shown in the table.

TABLE 1

|  | E1 | E2 | E3 | E4 |
| --- | --- | --- | --- | --- |
| COMPOUND |  |  |  |  |
| Homopolymer | 100 | 100 | — | — |
| Copolymer, VCM:Si223 = 100:2 | — | — | 100 | 100 |
| Diisononyl phthalate (plactiziser) | 60 | 60 | 60 | 60 |
| Lead stabilizer (Irgastab TK262 GV)[1] | 1.5 | — | 1.5 | — |
| Ba/Zn-stabilizer (Lancromark LZ616)[2] | — | 2 | — | 2 |
| ESO (Epoxidated soybean oil) | — | 3 | — | 3 |
| DBTL (Dibutyl leadlaurate) | — | 0.2 | — | 0.2 |
| RESULTS |  |  |  |  |
| Before steam treatment |  |  |  |  |
| Gel in THF, 24 h (%) | 0 | 0 | 63.0 | 0 |
| Relaxation (%): | 49.6 | 49.7 | 61.8 | 55.7 |
| After steam treatment: |  |  |  |  |
| Gel in THF, 24 h (%): | 0 | 0 | 64.3 | 76.6 |
| Relaxation (%): | 49.0 | 49.7 | 60.1 | 64.6 |

[1] = Supplied from Ciba Geigy
[2] = Supplied from Harcros

The results clearly show that when lead stabilizer is present, which also catalyzes crosslinking of silanes, a high degree of crosslinking is obtained, as shown by gel % by extraction in THF.

EXAMPLE 2

Corresponding relaxation- and gel measurements were carried out for two reference PVC homopolymers S1 and S2 produced by suspension polymerisation. A Ca/Zn-stabilizer was used for the first and a lead stabilizer was used for the second. There were also produced two compounds S3 and S4 with 0.4 weight % methacryloxy-propyltriethoxy-silane (Si223 from Degussa).

Foils were rolled at 170° C. and samples were taken after 5 minutes. Samples of foil rolled for 5 minutes were steam treated at 120° C. for 30 minutes. The foils were analyzed on a rheometer at 170 ° C. In Table 2 the compounds and results are shown.

TABLE 2

|  | S1 | S2 | S3 | S4 |
| --- | --- | --- | --- | --- |
| COMPOUND |  |  |  |  |
| Homopolymer | 100 | 100 | — | — |
| Copolymer, VCM:Si223 = 100:0.4 | — | — | 100 | 100 |
| Reomol LTM[3] | 50 | 50 | 50 | 50 |
| Sjohesten FF[4] | 10 | 10 | 10 | 10 |
| Lubricant[5] | 2 | 2 | 2 | 2 |
| Allied AC316[6] | 0.4 | 0.4 | 0.4 | 0.4 |
| Ca/Zn-stab. MC-KA-3[7] | 6 | — | 6 | 6 |
| Interstab. 3655[8] | — | 1.5 | — | — |
| Interstab. 3104[9] | — | 2 | — | — |
| DBTL Masterbatch[10] | 1.5 | 1.5 | — | — |
| DBTL | — | — | — | 0.4 |
| RESULTS |  |  |  |  |
| Before steam treatment: |  |  |  |  |
| Gel in THF, 24 h (%): | 0 | 0 | 0 | gel |
| Relaxation (%): | 14.9 | 10.8 | 13.0 | 27.7 |
| After steam treatment: |  |  |  |  |
| Gel in THF, 24 h (%) | 0 | 0 | 0 | 52.0 |

[3] = trimellitat plasticiser (Ciba Geigy)
[4] = filler CaCO$_3$ (Malmö Krita)
[5] = (Rhom & Haas), Paraloid K120
[6] = lubricant (Allied Chemicals)
[7] = (Berlocker)
[8] = Lead stabilizer (Akzo)
[9] = Lead stabilizer (Akzo)
[10] = dibutyl tinlaurate masterbatch, 4.5% active DBTL From the results it can clearly be seen that when silane comonomer is not present, there is not obtained gel in THF. This shows that crosslinking could not have taken place in the polymer. This is according to what should be expected of properties for an ordinary homopolymer. The results for S3–S 4 further show that a silane content in the range of 0.1 mol (0.4 weight %) is too little because the degree of crosslinking is small.

As could be seen from the table the experiments with rolling of the copolymer were based on Ca/Zn stabilizer. Separate experiments were carried out without/with DBTL and also DBTL Masterbatch with 4.5 % DBTL as condensation catalyst. The results clearly show that DBTL has a violent catalyzing effect to the silane crosslinking.

It has turned out to be most practical to use DBTL Masterbatch—technique to optimally control the crosslinking optimal. With pure DBTL stabilizer, even in small amounts, one obtains too early and too rigid crosslinking during the processing at high temperature. In the preceding examples therefore only DBTL Masterbatch technique was used.

EXAMPLE 3

Experiments corresponding to example 2 were carried out with copolymer, but with a larger content of methacryloxy-propyltriethoxy-silane (0.5 mol %). Compounds and results are shown in Table 3.

TABLE 3

|  | S5 | S6 | S7 |
|---|---|---|---|
| COMPOUND, Copolymer | | | |
| Copolymer VCM:Si223 = 100:2 | 100 | 100 | 100 |
| Reomol LTM | 50 | 50 | 50 |
| Sjohesten FF | 10 | 10 | 10 |
| Lubricant | 2 | 2 | 2 |
| Allied AC316 | 0.4 | 0.4 | 0.4 |
| Ca/Zn-stab. MC-KA-3 | 6 | 6 | 6 |
| DBTL | — | 0.4 | — |
| DBTL Masterbatch m/4.5% DBTL | — | — | 1.5 |
| RESULTS, Copolymer | | | |
| Before steam treatment: | | | |
| Gel in THF (%): | 0 | 60 | 0 |
| Relaxation (%): | 14.2 | 34.8 | 18.3 |
| After steam treatment: | | | |
| Gel in THF (%): | gel | 71.2 | 46.3 |
| Relaxation (%): | 22.0 | 45.7 | 32.4 |

From the table it could be seen that the crosslinking effect of DBTL is even stronger. Good effect regarding crosslinking is also shown with use of DBTL Masterbatch technique for experiment S7. The Congo-Red value for S7 (before steam treatment) was measured to >150 minutes.

EXAMPLE 4

Corresponding experiments to the preceding example were carried out, but a copolymer with 0.25 mol % (1 weight %) methacryloxy-propyltriethoxy-silane and lead stabilizer was used.

TABLE 4

|  | S8 | S9 | S10 |
|---|---|---|---|
| COMPOUND | | | |
| Copolymer VCM:Si223 = 100:1 | 100 | 100 | 100 |
| Reomol LTM | 50 | 50 | 50 |
| Sjohesten FF | 10 | 10 | 10 |
| Lubricant | 2 | 2 | 2 |
| Allied AC316 | 0.4 | 0.4 | 0.4 |
| Interstab. 3655 | 3.0 | 3.0 | 1.5 |
| Interstab. 3104 | 2.5 | 2.5 | 2.0 |
| DBTL Masterbatch | — | 1.5 | 1.5 |
| Mercaptosilane (Dynasylan 3201)[11] | — | — | 1.8 |
| RESULTS | | | |
| Before steam treatment: | | | |
| Gel in THF (%): | gel | gel | 0 |
| Relaxation (%) | 27.6 | 33.6 | 14.4 |
| After steam treatment: | | | |
| Gel in THF (%) | 74.0 | 76.0 | 84.0 |
| Relaxation (%): | 39.9 | 49.8 | 27.9 |

[11] = (Hüls)

Congo-red measurement for S9 before steam treatment: > 145

The results show which catalyzing effect the lead stabilizers have to silane condensation. Even without Masterbatch (S8) a high degree of crosslinking is obtained and in experiment S10 is shown how efficient mercaptosilane is to prevent too early crosslinking. The same effect is observed with glycidyloxy triethoxysilane and bis(3-triethoxy propyl) disulphide.

The relaxation measurements for S10, where mercaptosilane is added, seems to be unlikely high. However the figures observed from weight % gel and % relaxation after steam treatment could be explained theoretically. Mercaptosilane prevents too early crosslinking but at the same time forms a more complete crosslinked polymer network as the triethoxy silane group will add to the silane groups which are in the polymer molecule. In this way one would obtain a high degree of gel insoluble in THF at the same time as this network is flexible there and extremely strong. It must be remarked that in S10 is added some less lead stabilizer than in S8 and S9. This however will not influence the results worth mentioning.

EXAMPLE 5

In this experiment there was used a copolymer of vinyl chloride and 0.25 mol % Si223. Rolling experiments were carried out at 160° C. and 170° C. and with a rolling time of 3 minutes for two of the samples. The last sample was rolled for 5 minutes at 170° C.

TABLE 5

|  | S11 | S12 | S13 |
|---|---|---|---|
| COMPOUND | | | |
| Rolling time | 3 min. | 3 min. | 5 min. |
| Rolling temperature, °C. | 160 | 170 | 170 |
| Copolymer VCM:Si223 = 100:1 | 100 | 100 | 100 |
| Reomol LTM | 50 | 50 | 50 |
| Sjohesten FF | 10 | 10 | 10 |
| Lubricant | 2 | 2 | 2 |
| Allied AC316 | 0.4 | 0.4 | 0.4 |
| Ca/Zn-stab. MC-KA-3 | 6 | 6 | 6 |
| DBTL Masterbatch | 1.5 | 1.5 | 1.5 |
| Dimer silane Si266[12] | — | — | 3.0 |
| RESULTS | | | |
| Before heat treatment: | | | |
| Gel in THF (%): | 0 | 0 | 0 |
| Relaxation (%) | 27.1 | 22.9 | 20.2 |
| After steam treatment: | | | |
| Gel in THF (%) | 64.0 | 60.0 | 50.0 |
| Relaxation (%): | 41.0 | 39.0 | 36.8 |

[12] = (Degussa)

As expected the results are relatively similar. In experiment S13 the inhibiting effect of bis(3-triethoxysysilyl propyl)disulphide is shown. Si266 can preferably be added in smaller amounts and still have an inhibiting effect.

EXAMPLE 6

Experiments were carried out using the same copolymer as in the previous example. There was used lead stabilizer, dioctylphphalate (DOP) as plasticizer and a filler (Myanitt). The compounds and results are shown in table 6.

TABLE 6

|  | S14 | S15 |
|---|---|---|
| COMPOUND | | |
| Copolymer VCM:Si223 = 100:1 | 100 | 100 |
| DOP | 56 | 56 |
| Myanitt[13] | 5 | 5 |
| Lubricant | 2 | 2 |
| Allied AC316 | 0.4 | 0.4 |
| Interstab. 3655 | 5 | 5 |
| Interstab. 3104 | 3 | 3 |
| DBTL Masterbatch | 1.5 | 1.5 |

TABLE 6-continued

|  | S14 | S15 |
|---|---|---|
| Mercaptosilane (Dynasylan 3201) | — | 2.5 |
| RESULTS | | |
| Before steam treatment: | | |
| Gel in THF (%): | gel | 0 |
| Relaxation (%) | 40.8 | 25.7 |
| After steam treatment: | | |
| Gel in THF (%) | 73.0 | 89.0 |
| Relaxation (%): | 47.3 | 49.1 |

[13] = filler (Ernström Mineral AB)

The experiments with the compounds S14 and S15 show the effect of a lead stabilized recipe with regard to silane crosslinking and also the efficient inhibiting effect mercaptosilane has to prevent too early crosslinking in this system.

EXAMPLE 7

Experiments were carried out where methacryloxy-propyltrimethoxy-silane (Fluka) was used as comonomer together with VCM. As methoxy-groups generally are more reactive than ethoxy groups, higher reactivity was expected. The experiments were carried out without the use of a condensation catalyst. The material was rolled for 5 minutes at 170° C.

TABLE 7

|  | S16 |
|---|---|
| COMPOUND | |
| Copolymer VCM:silane = 100:1 | 100 |
| Rheomol LTM | 50 |
| Sjohesten FF | 10 |
| Lubricant | 2 |
| Allied AC316 | 0.4 |
| Ca/Zn-stab. MC-KA-3 | 6 |
| RESULTS | |
| Before steam treatment: | |
| Gel in THF, 24 h (%): | 0 |
| Relaxation (%): | 16.0 |
| After steam treatment: | |
| Gel in THF, 24 h (%): | 62 |
| Relaxation (%): | 44.8 |

Several of the examples show that in lead stabilized compounds it is necessary to prevent too early crosslinking during processing. This can be controlled with the amount of and the time for introduction of condensation catalyst and/or the addition of inhibitor.

With this invention one has found a process for crosslinking of halogen containing polymers via introduction of silane groups via a comonomer. It is a comonomer with a silane functional group that is introduced in this way during copolymerisation, which crosslinks intermolecularly. In the new system one preferably could process the copolymers under moderate conditions, i.e. shorter time and lower temperature. This again leads to the result that the rest stability is increased and thereby the total lifetime of the product, and also that strenght and finish is maintained longer.

With this method the crosslinking can be separated from the processing in that it is catalyzed with water after the processing is carried out and if necessary, further is controlled by addition of an inhibitor which will prevent too early crosslinking. A polymer insoluble in THF is obtained independent of which type of stabilizer that is used.

We claim:

1. Method for the production of a thermostable crosslinked PVC copolymer where the crosslinking is carried out in the presence of humidity and after processing of the polymer, characterized in that there is used a copolymer of vinyl chloride and 0.05–10 weight % of a vinyl containing alkoxysilane compound with the general formula

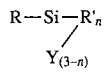

where

R= methacryloxypropyl- or acryloxypropyl- function
R'=freely chosen non-hydrolyzable group
Y=a hydrolyzable group, and n= 0,1 or 2.

2. Method according to claim 1, characterized in that the group Y is selected from —OCH$_3$, —OC$_2$H$_5$, —OC$_3$H$_7$, —OC$_2$H$_4$OCH$_3$ or —OC$_4$H$_9$.

3. Method according to claim 1, characterized in that there is used 0.1–4 weight % vinyl containing alkoxysilane.

4. Method according to claim 1, characterized in that there is used methacryloxy-propyltrimethoxy-silane or methacryloxy-propyltriethoxy-silane.

5. Method according to claim 1, characterized in that there is used a copolymer produced by emulsion-, microsuspension- or suspension-polymerisation.

6. Method according to claim 1, characterized in that silane is added in several doses or continuously during the polymerisation.

7. Method according to claim 1, characterized in that the crosslinking is carried out in the presence of 0–10 weight % stabilizer.

8. Method according to claim 1, characterized in that there is added a condensation catalyst for crosslinking of silanol groups.

9. Method according to claim 1, characterized in that there is used 0–5 weight % inhibitor.

10. Thermostable crosslinked PVC composition, where the crosslinking is carried out in the prescence of humidity and after processing of the material, characterized in that it comprises 30–98 weight % copolymer of vinyl chloride and 0.05–10 weight % of a vinyl containing alkoxysilane compound of the general formula

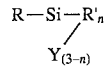

where

R= methacryloxypropyl- or acryloxypropyl- function
R'= freely chosen non-hydrolyzable group
Y=hydrolyzable group, and n=0,1 or 2,
0–70 weight % plasticizer 0–10 weight % stabilizer, 0–3 weight % lubricant, 0–5 weight % inhibitor and 0–15 weight % filler.

11. Composition according to claim 10, characterized in that methacryloxy-propyltrimethoxy-silane or methacryloxy-propyltriethosy-silane is used.

12. Composition according to claim 10, characterized in that it also comprises 0–30 weight % PVC homopolymer, nitrile rubber, chloroprene rubber, ABS, PVAC or PC.

13. Method according to claim 7, characterized in that the stabilizer is Ca/Zn, Ba/Zn, Sn or lead stabilizer.

14. Method according to claim 9, characterized in that the inhibitor is a dimeric silane, an alkylsilane, a mercaptosilane or a disulphide.

* * * * *